United States Patent
Yamaguchi

(10) Patent No.: US 7,505,121 B2
(45) Date of Patent: Mar. 17, 2009

(54) MULTI-BEAM OPTICAL RANGE SENSOR AND SELF-PROPELLED CLEANER AND AIR-CONDITIONER EQUIPPED WITH THE SAME

(75) Inventor: Akifumi Yamaguchi, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 84 days.

(21) Appl. No.: 11/410,950

(22) Filed: Apr. 26, 2006

(65) Prior Publication Data

US 2006/0244945 A1    Nov. 2, 2006

(30) Foreign Application Priority Data

Apr. 28, 2005   (JP)   ............... 2005-131286

(51) Int. Cl.
 *G01C 3/08*    (2006.01)
(52) U.S. Cl. .............. 356/5.03; 356/5.01; 356/28; 356/28.5; 356/499
(58) Field of Classification Search ............ 356/5.03, 356/5.01, 28–28.5
 See application file for complete search history.

(56) References Cited

U.S. PATENT DOCUMENTS

| | | | | |
|---|---|---|---|---|
| 4,380,391 A | * | 4/1983 | Buser et al. ............... | 356/5.06 |
| 4,668,086 A | * | 5/1987 | Redner ..................... | 356/33 |
| 5,056,887 A | * | 10/1991 | Ohshima ................... | 385/36 |
| 5,502,466 A | * | 3/1996 | Kato et al. ................ | 356/499 |
| 5,534,693 A | * | 7/1996 | Kondo et al. ............. | 250/237 G |
| 6,141,086 A | * | 10/2000 | Vahala et al. .............. | 356/28.5 |
| 6,314,341 B1 | * | 11/2001 | Kanayama ................ | 701/1 |
| 2003/0025999 A1 | * | 2/2003 | Mercer ..................... | 359/563 |
| 2003/0184729 A1 | * | 10/2003 | Bowers .................... | 356/5.1 |
| 2004/0027577 A1 | * | 2/2004 | Sugiyama et al. ........ | 356/498 |
| 2004/0089346 A1 | * | 5/2004 | Sutardja ................... | 137/377 |

FOREIGN PATENT DOCUMENTS

| | | |
|---|---|---|
| JP | 59-193407 A | 11/1984 |
| JP | 9-203631 | 8/1997 |

\* cited by examiner

*Primary Examiner*—Thomas H Tarcza
*Assistant Examiner*—Timothy A Brainard
(74) *Attorney, Agent, or Firm*—Nixon & Vanderhye P.C.

(57) ABSTRACT

In this multi-beam optical range sensor, since the diffraction grating splits output light of the light-emitting element into a plurality of beams, a plurality of beams can be outputted from the diffraction grating even with one light-emitting element. Therefore, according to this multi-beam optical range sensor, the numbers of the light-emitting elements and the light-emission side lenses can be cut down, the space on the light emission side can be reduced, and the sensor can be downsized. Also according to this range sensor, there is no need for scanning a plurality of light-emitting elements and so the detection time can be shortened.

9 Claims, 6 Drawing Sheets

OUTPUT LIGHT

MULTI-BEAM OPTICAL RANGE SENSOR AND SELF-PROPELLED CLEANER AND AIR-CONDITIONER EQUIPPED WITH THE SAME

CROSS-REFERENCE TO RELATED APPLICATIONS

The present non-provisional application claims priority based on JP 2005-131286 applied for patent in Japan on Apr. 28, 2005 under U.S. Code, Volume 35, Chapter 119(a). The disclosure of the application is fully incorporated herein by reference.

BACKGROUND

An exemplary embodiment presented herein relates to a multi-beam optical range sensor and, for example, to a multi-beam optical range sensor for detecting a direction and a distance of a measuring object, which is to be measured, by detecting whether or not the measuring object is present within a certain range.

Conventionally, a multi-beam optical range sensor, as shown in FIGS. 7A to 7C, includes a plurality of light-emitting elements 114, and light-emission side lenses 115 equal in number to the plurality of light-emitting elements 114 (see JP H09-203631 A).

Light outputted from the light-emitting elements 114, passing via the light-emission side lenses 115, is reflected by a detection object, and the resulting reflected light is condensed by a light-reception side lens 116, forming a spot on a light-receiving element 117 serving as a position-detecting element. It is noted here that the light-reception side lens 116 comprises one toroidal lens and the light-receiving element 117 comprises also one element.

Therefore, while the plurality of light-emitting elements 114 are made to emit light one by one with the timing shifted for each, output signals of the light-receiving element 117 are read in synchronization with the timing of light emission of each light-emitting element 114, so that a direction of the detection object as well as a distance to the detection object can be detected by an output signal obtained from the light-receiving element 117 responsive to the timing of the light emission of each light-emitting element 114.

For this prior-art multi-beam optical range sensor, which includes a plurality of light-emitting elements 114 and a plurality of light-emission side lenses 115, there has been a need for allowing a larger space for the light emission side. As a result of this, the sensor would be large in scale as a whole.

Besides, since the plurality of light-emitting elements 114 are made to emit light one by one with the timing delayed and the signal of the light-receiving element 117 on the light reception side is read in synchronization with the timing, the light-emitting elements 114 need to be made to emit light all in order in order to detect detection objects present over a wide range, taking longer time to detect the direction and distance of a detection object.

Also in the prior art example, each beam emitted in its specified direction is scanned. In this case, when a person attempts to add a scan of the emitted beam in another direction in order to, for example, detect in a perpendicular direction to the above scanning direction, there is a need for adding the light-emitting elements and the light-emission side lenses each in the same number as those of the foregoing, and further adding the light-receiving element 117 on the reception side as well as the light-reception side lens 116. As a result of this, the sensor would become bigger in scale as a whole, hence no longer practical.

BRIEF SUMMARY

Accordingly, feature of exemplary embodiments presented herein is to provide a multi-beam optical range sensor which allows a downsizing of its scale as well as a reduction in detection time.

In order to achieve the above object, there is provided a multi-beam optical range sensor comprising:

a light-emitting element;

a diffraction grating for diffracting and splitting output light of the light-emitting element into a plurality of beams;

a plurality of light-receiving parts for receiving reflected beams which are derived from the split into the plurality of beams by the diffraction grating and reflection by a measuring object that is to be measured; and a control section for processing a plurality of light-reception signals outputted by the plurality of light-receiving parts and driving the light-emitting element at a specified timing.

In this multi-beam optical range sensor of the invention, output light outputted by the light-emitting element is split into a plurality of beams by the diffraction grating, and the resulting plurality of beams are reflected by a measuring object to go incident on a plurality of light-emitting parts as a plurality of reflected beams. The plurality of light-receiving parts output a plurality of light-reception signals in response to the incident reflected beams, and the control section processes the plurality of light-reception signals to detect a direction of the measuring object and a distance to the measuring object.

In this exemplary embodiment, since the diffraction grating splits output light of the light-emitting element into a plurality of beams, a plurality of beams can be outputted from the diffraction grating even with one light-emitting element. Therefore, according to this exemplary embodiment, as compared with the prior arts, the numbers of the light-emitting element and the light-emission side lens can be cut down, the space on the light emission side can be reduced, and the sensor can be downsized. Also according to this exemplary embodiment, there is no need for scanning a plurality of light-emitting elements and so the detection time can be shortened.

Desirably, the control section detects the distance to the measuring object by a trigonometrical method based on the light-reception signals. Also, the control section is desirably implemented by a semiconductor integrated circuit as an example.

In one exemplary embodiment, the light-emitting element is a semiconductor laser.

In this case, since the output light becomes laser light, which is coherent light of high directivity, the direction of the measuring object and the distance to the measuring object can be detected with high accuracy.

In one exemplary embodiment, the plurality of light-receiving parts are equal in number to the plurality of beams, and the multi-beam optical range sensor includes one light-receiving element having the plurality of light-receiving parts.

In this case, since the plurality of beams can be received simultaneously by the plurality of light-receiving parts of the one light-receiving element, further downsizing of the sensor by the cut-down of parts count as well as reduction in the detection time can be achieved.

In one exemplary embodiment, the diffraction grating splits the output light into a plurality of beams of generally equal intensity.

In this case, since the diffraction grating splits the output light into a plurality of beams of generally equal intensity, occurrence of any misdetection due to a lack of reflected light of particular beams can be prevented beforehand.

In one exemplary embodiment, the diffraction grating has a first region in which a first plurality of grooves is formed, and a second region in which a second plurality of groove generally perpendicular to the first plurality of grooves is formed, and the multi-beam optical range sensor further includes a first light-receiving part which is so placed as to receive a beam diffracted by the first region, a second light-receiving part which is so placed as to receive a beam diffracted by the second region, and a switching part for selecting either one of the first and second regions so as to allow a beam to be outputted from the selected region but inhibit a beam from being outputted from the non-selected region.

In this case, the switching part selects either one of the first region and the second region, which are provided with respective grooves perpendicular to each other, so that a beam is outputted from the selected region. Then, the first light-receiving part receives a beam diffracted by the first region while the second light-receiving part receives a beam diffracted by the second region. The control section processes the first and second light-reception signals outputted by the first and second light-receiving parts to detect the distance to the measuring object by, for example, the trigonometrical method.

As a result of this, it becomes implementable to detect the position of a measuring object as well as the distance to the measuring object over a range in directions corresponding to and perpendicular to the first region of the diffraction grating.

In one exemplary embodiment, the switching part has a first liquid crystal shutter placed in opposition to the first region of the diffraction grating, and a second liquid crystal shutter placed in opposition to the second region of the diffraction grating.

In this case, the switching part sets either one of the first, second liquid crystal shutters into a light-transmitting state, and the other of the first, second liquid crystal shutters into a light-shielding state. Therefore, by controlling the opening and closing of the first, second liquid crystal shutters, the switching part can select either one of the first, second regions so as to allow a beam to be outputted from the selected region but inhibit a beam from being outputted from the non-selected region.

In one exemplary embodiment, the switching part has an actuator for moving the diffraction grating so as to make output light of the light-emitting element incident on a selected either one of the first and second regions but to inhibit output light of the light-emitting element from being incident on the other non-selected either one of the first and second regions.

In this case, the switching part makes the diffraction grating move by means of the actuator. Thus, with the first region or the second region of the diffraction grating selected, the output light can be made incident on the selected region alone.

In one exemplary embodiment, the control section receives inputs of specified pulse signals and reads a plurality of light-reception signals derived from the plurality of light-receiving parts with specified time delays corresponding to the pulse signals, respectively, from one terminal.

In this case, there is a merit that one terminal will do for reading a plurality of light-reception signals derived from the plurality of light-receiving parts.

In one exemplary embodiment, the multi-beam optical range sensor further comprises output terminals which are equal in number to the plurality of light-receiving parts, wherein light-reception signals derived from the light-receiving parts are read out from the output terminals in parallel, respectively.

In this exemplary embodiment, since a plurality of output terminals are included to read a plurality of light-reception signals in parallel, high-speed reading becomes implementable.

In one exemplary embodiment, the diffraction grating has a first region in which a first plurality of grooves is formed, and a second region in which a second plurality of grooves generally perpendicular to the first grooves is formed, and the multi-beam optical range sensor further includes a first light-receiving part which is so placed as to receive a beam diffracted by the first region, and a second light-receiving part which is so placed as to receive a beam diffracted by the second region, and the light-emitting element has a first light-emitting point for outputting first output light which is made to go incident on either one of the first and second regions, and a second light-emitting point for outputting second output light which is made to go incident on the other either one of the first and second regions, and wherein the control section performs control for drive of the light-emitting element so that either one of the first and second light-emitting points is selected so as to emit light.

In this case, the light-receiving element has first, second light-emitting points for outputting first, second output light, and the control section makes either one of the first, second light-emitting points selected emit light. As a result of this, without the need for the liquid crystal shutter or the actuator for moving the diffraction grating, either one of the first, second regions of the diffraction grating can be selected and the selected region is made to emit a beam. Thus, the sensor can be simplified in its drive and downsized as well.

In one exemplary embodiment, the self-propelled cleaner is equipped with the multi-beam optical range sensor described above. By virtue of this, the cleaner runs by self propulsion while detecting any obstacles or walls or the like as measuring objects in a room, thus enabled to clean automatically and fulfill efficient cleaning.

In one exemplary embodiment, the air conditioner is equipped with the multi-beam optical range sensor described above. By virtue of this, the air conditioner can detect a position at which a person is in a room and, based on this detection, an optimum state as to the direction and intensity of air, temperature and the like can be controlled, thus making it implementable to provide an air conditioner which is human-body friendly and energy-saving.

According to the multi-beam optical range sensor of the exemplary embodiment, since the diffraction grating splits output light of the light-emitting element into a plurality of beams, a plurality of beams can be outputted from the diffraction grating even with one light-emitting element. Therefore, according to this exemplary embodiment, as compared with the prior arts, the numbers of the light-emitting element and the light-emission side lens can be cut down, the space on the light emission side can be reduced, and the sensor can be downsized. Also according to this exemplary embodiment, there is no need for scanning a plurality of light-emitting elements and so the detection time can be shortened.

BRIEF DESCRIPTION OF THE DRAWINGS

The exemplary embodiment presented herein will become more fully understood from the detailed description given hereinbelow and the accompanying drawings which are given by way of illustration only, and thus are not limitative of the present exemplary embodiment, and wherein.

DETAILED DESCRIPTION OF THE PREFERRED EMBODIMENTS

Hereinbelow, the exemplary embodiment presented herein will be described in detail by embodiments thereof illustrated in the accompanying drawings.

Figure 1A:
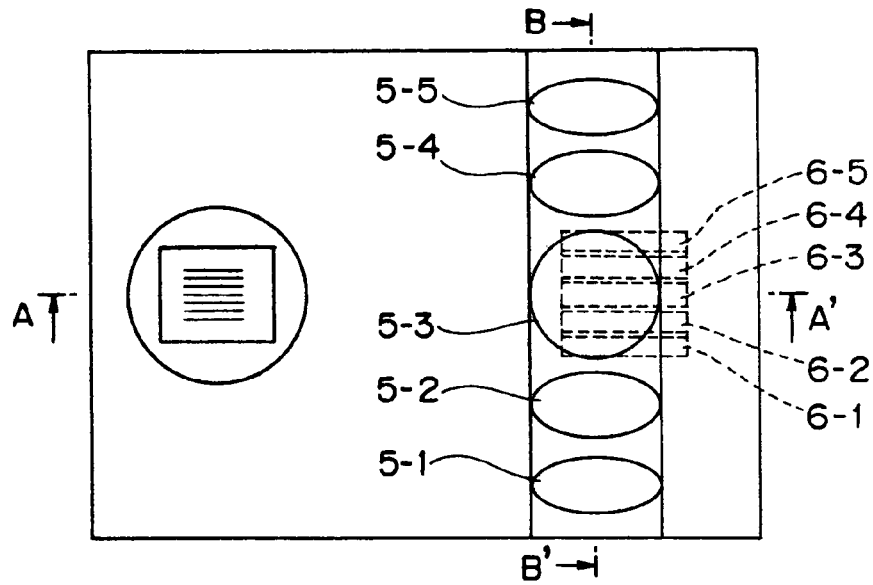
FIG. 1A is a plan view showing an embodiment of the multi-beam optical range sensor.
Figure 1B:
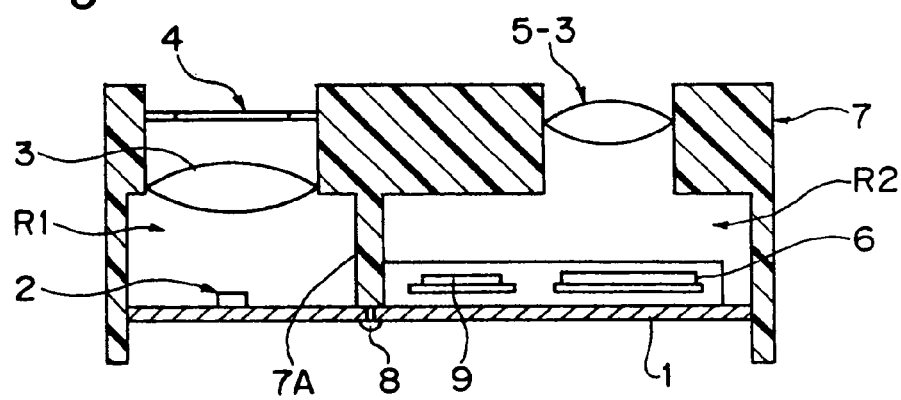
FIG. 1B is a sectional view taken along the line A-A' of FIG. 1A.
Figure 1C:
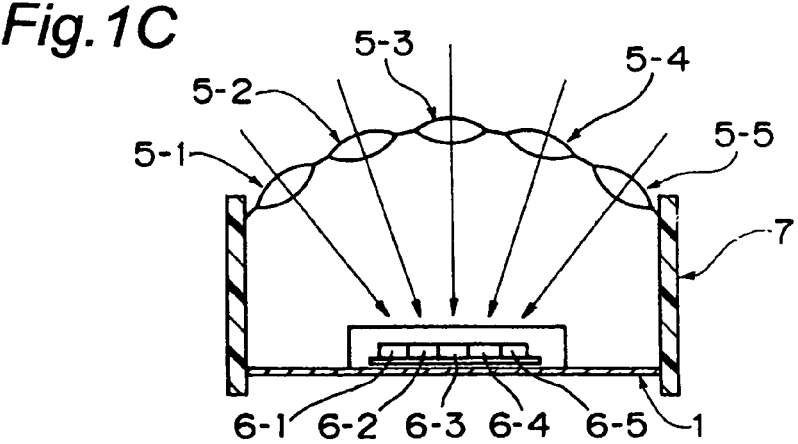
FIG. 1C is a sectional view taken along the line B-B' of FIG. 1A.

FIGS. 1A to 1C show an exemplary embodiment of the multi-beam optical range sensor. FIG. 1A is a plan view of this embodiment, FIG. 1B is a sectional view taken along the line A-A' of FIG. 1A. FIG. 1C is a sectional view taken along the line B-B' of FIG. 1A.

The multi-beam optical range sensor of this embodiment includes a board 1 and a casing 7 fitted to the board 1. The casing 7 has a room R1 and a room R2 separated from each other by an inner wall 7A.

One light-emitting element 2 is placed on the board 1 within the room R1 of the casing 7. Also, one light-emission side lens 3 for collimating light emitted from the light-emitting element 2 into generally parallel light is fitted within the room R1 of the casing 7. In the room R1 of the casing 7 is fitted a diffraction grating 4 for diffracting the parallel light derived from the light-emission side lens 3. It is noted here that the light-emitting element 2 is preferably given by a semiconductor laser. That is, the output light, if given by laser light, becomes coherent light of high directivity, so that the direction of the measuring object and the distance to the measuring object can be detected with high accuracy.

Also, a light-receiving element 6 and a control section 9 are placed within the room R2 of the casing 7. This light-receiving element 6 is provided in the form of one chip placed on the board 1. As shown in FIG. 1C, the one light-receiving element 6 includes five light-receiving parts 6-1 to 6-5 as an example.

Besides, a light-reception side lens 5 is fitted within the room R2 of the casing 7. The light-reception side lens 5 includes five lens parts 5-1 to 5-5. These five lens parts 5-1 to 5-5 condense reflected beams which result from output light derived from the light-emitting element 2, the output light being diffracted and split by the diffraction grating 4 into a plurality (five as an example) of beams and then reflected by the measuring object (not shown). One reflected beam goes incident on each of the lens parts 5-1 to 5-5, and the reflected beams condensed by the individual lens parts 5-1 to 5-5 go incident on the light-receiving parts 6-1 to 6-5, respectively. In addition, although one light-receiving element 6 includes a plurality of light-receiving parts 6-1 to 6-5 in this embodiment, a plurality of light-receiving elements each having one light-receiving part may be included. However, such a case where one light-receiving element includes a plurality of light-receiving parts as in this embodiment has a merit that the sensor can be downsized. Also, the light-reception lens 5 may be provided as a toroidal type optical lens having a semicircular-arc shaped cross section.

A plurality of light-reception signals outputted by the light-receiving element 6 having the light-receiving parts 6-1 to 6-5 are inputted to the control section 9. The control section 9 processes the plurality of light-reception signals to determine the distance to the measuring object by, for example, a trigonometrical method. Further, the control section 9 drives the light-emitting element 2 at a specified timing. It is noted that the control section 9 is preferably implemented by a semiconductor integrated circuit. Besides, the light-emission side lens 3, the diffraction grating 4 and the light-reception lens 5 are integrated by the casing 7 in this embodiment. Also, two color formation is preferably used as the method for fixing the lenses 3 and 5 to the casing 7.

In this embodiment, the casing 7 is so structured that the room R1 and the room R2 are separated from each other by the inner wall 7A, by which the output light derived from the light-emitting element 2 is prevented from going incident directly on the light-receiving element 6. Further, the casing 7 is made from electrically conductive resin material while the inner wall 7A of the casing 7 is electrically connected to the ground pattern of the board 1 that serves as a ground terminal of the sensor by means of a metal screw 8. As a result of this, any effects of external electromagnetic noise can be removed by a shielding effect of the casing 7, thus allowing stable outputs to be obtained.

Figure 2A:
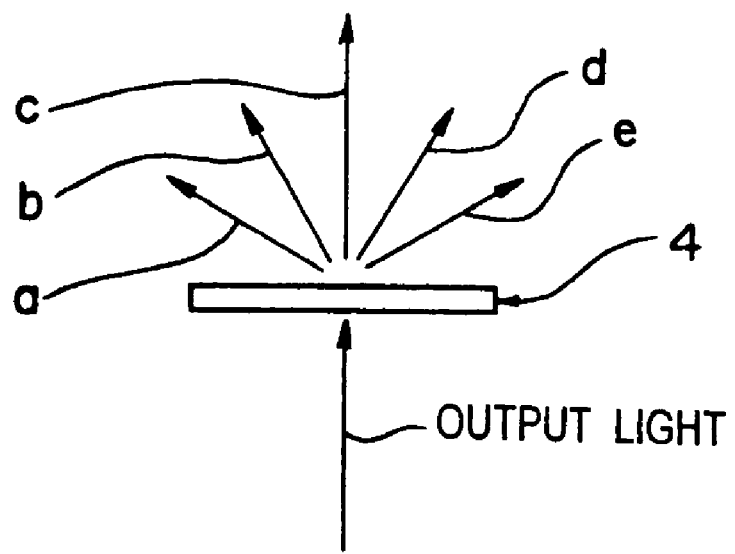
FIG. 2A is a schematic view showing a state that a diffraction grating 4 of the embodiment splits an output beam into a plurality of beams.
Figure 2B:
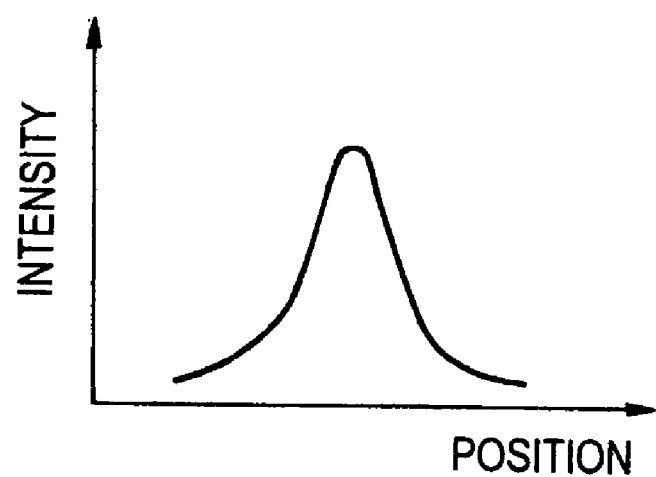
FIG. 2B is an intensity distribution chart representing an intensity distribution of the beams a-e (diffracted light) shown in FIG. 2A.

In the multi-beam optical range sensor of this embodiment, as shown in FIG. 2A, the diffraction grating 4 diffracts and splits output light of the light-emitting element 2 into a plurality of beams (diffracted light) a to e, where these beams a-e can be equalized in intensity to each other. As a result of this, the quantity of each reflected light become equal and misdetection due to a lack of reflected light of the particular beams can be prevented. It is noted that FIG. 2B is an intensity distribution chart representing an intensity distribution of the beams a-e (diffracted light).

According to this embodiment, since the diffraction grating 4 splits the output light of the light-emitting element 2 into a plurality of beams a-e, it becomes possible to emit a plurality of beams a-e from the diffraction grating 4 even with one light-emitting element 2. Therefore, according to this embodiment, as compared with the prior arts, the numbers of the light-emitting element 2 and the light-emission side lens 3 can be cut down, the space on the light emission side can be reduced, and the sensor can be downsized. Also according to this embodiment, there is no need for scanning a plurality of light-emitting elements and so the detection time can be shortened.

Further, in this embodiment, the control section 9 receives inputs of specified pulse signals and reads a plurality of light-reception signals derived from the five light-receiving parts 6-1 to 6-5 with specified time delays corresponding to the pulse signals, respectively, from one terminal. As a result of this, there is a merit that one terminal will do for reading five light-reception signals derived from the five light-receiving parts 6-1 to 6-5. Moreover, output terminals equal in number to the five light-receiving parts 6-1 to 6-5 may be provided so that light-reception signals derived from the light-receiving parts 6-1 to 6-5, respectively, are read in parallel from the respective output terminals. In this case, since a plurality of output terminals are provided and a plurality of light-reception signals are read in parallel, reading speed of the signals becomes higher.

In addition, in this embodiment, although the diffraction grating 4 splits output light of the light-emitting element 2 into five beams and five light-receiving parts are provided to receive the resulting five beams, yet the number of beams to be split by the diffraction grating is not limited to five as a matter of course, the number of beams may be six or more, or four or less. The number of light-receiving parts may be set in correspondence to the number of beams.

FIRST MODIFICATION EXAMPLE

Figure 3A:
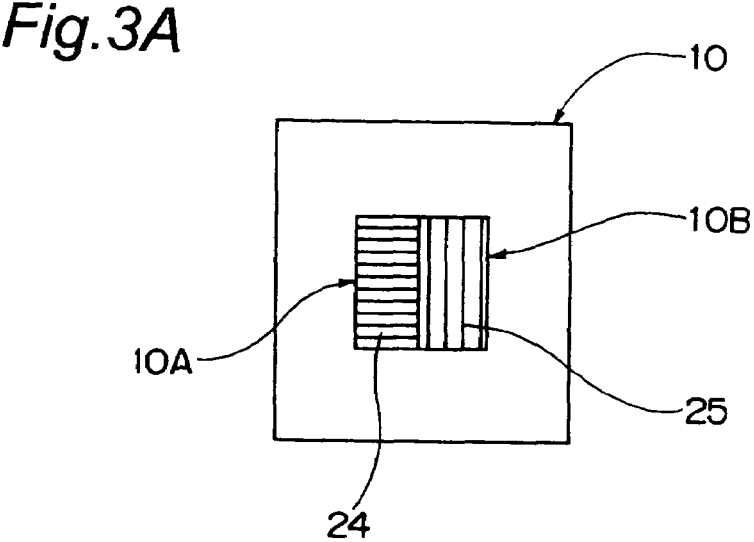
FIG. 3A is a plan view showing a diffraction grating 10 included in a first modification example of the embodiment.
Figure 3B:
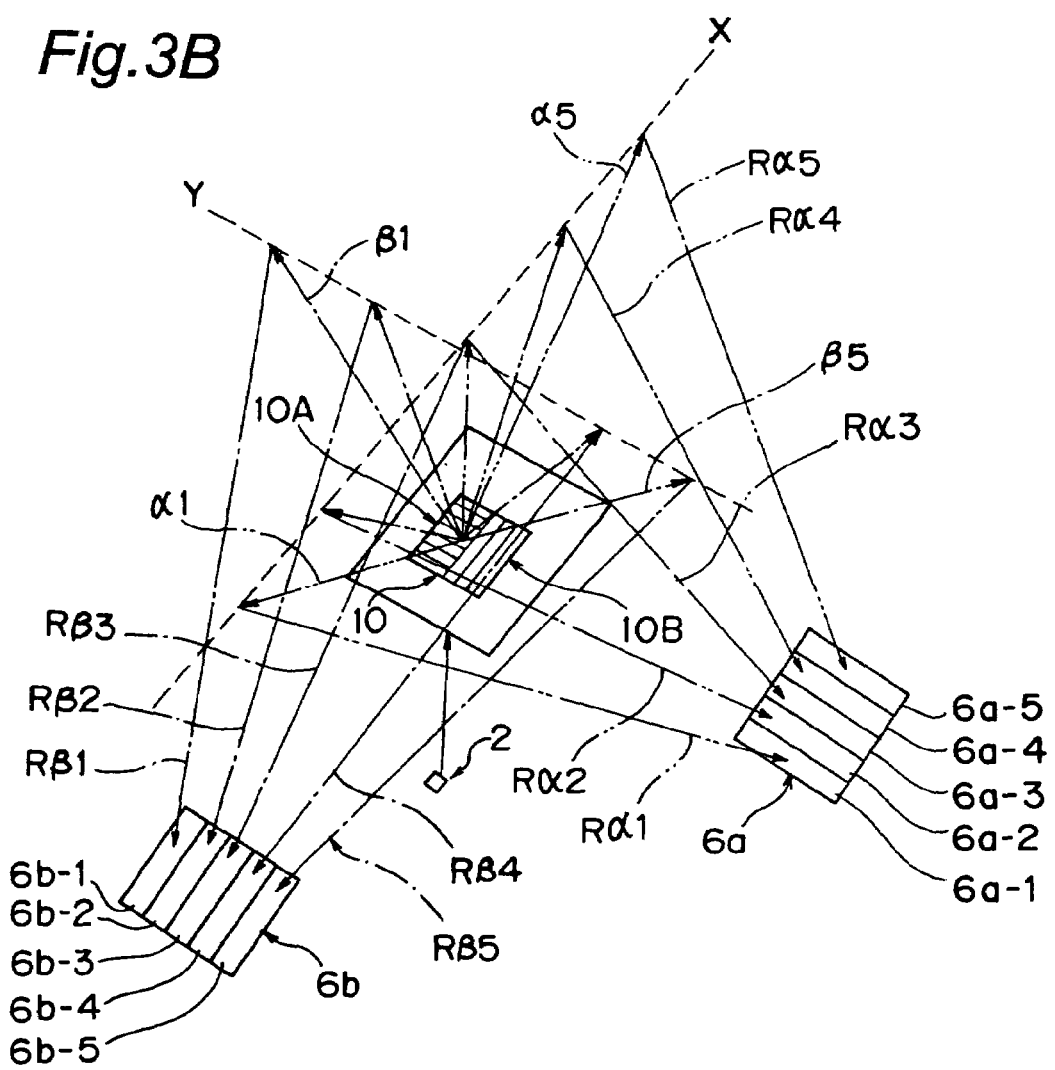
FIG. 3B is a schematic view showing a state that a plurality of beams derived from the diffraction grating 10 are reflected by measuring object to go incident on two light-receiving elements 6a, 6a as reflected beams in the first modification example.

Next, referring to FIGS. 3A and 3B, a first modification example of the foregoing embodiment is explained. This modification example includes a diffraction grating 10 in place of the diffraction grating 4.

As shown in FIG. 3A, the diffraction grating 10 has a first region 10A in which a first plurality of grooves 24 is formed, and a second region 10B in which a second plurality of grooves 25 generally perpendicular to the first plurality of grooves 24 is formed. This first modification example, as shown in FIG. 3B, includes a light-receiving element 6a and a light-receiving element 6b as an example, where the light-receiving element 6a has light-receiving parts 6a-1 to 6a-5 as a first light-receiving part. Also, the light-receiving element 6b has light-receiving parts 6b-1 to 6b-5 as a second light-receiving part.

As shown in FIG. 3B, a plurality of beams α1 to α5 resulting from diffraction of output light from the light-emitting element 2 by the first region 10A of the diffraction grating 10 are reflected by a measuring object which extends along an X direction and which is present at a position indicated by broken line, resulting in reflected beams Rα1 to Rα5 that go incident on the light-receiving parts 6a-1 to 6a-5 as the first light-receiving part, respectively. Meanwhile, a plurality of beams β1 to β5 resulting from diffraction of output light from the light-emitting element 2 by the second region 10B of the diffraction grating 10 are reflected by a measuring object which extends along a Y direction perpendicular to the X direction and which is present at a position indicated by broken line, resulting in reflected beams Rβ1 to Rβ5 that go incident on the second light-receiving parts 6b-1 to 6b-5, respectively.

Further, this modification example includes, as an example, a switching part for selecting either one of the first region 10A and the second region 10B of the diffraction grating 10 shown in FIG. 3A so as to allow a beam to be outputted from the selected region but inhibit a beam from being outputted from a non-selected region. A liquid crystal shutter may be adopted as the switching part.

Figure 4A:
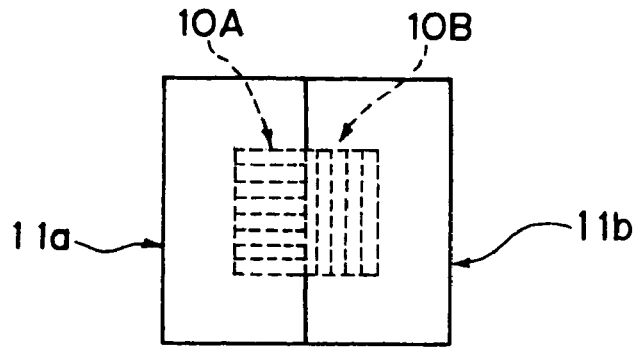
FIG. 4A is a plan view showing a liquid crystal shutter as a switching part of the first modification example.
Figure 4B:
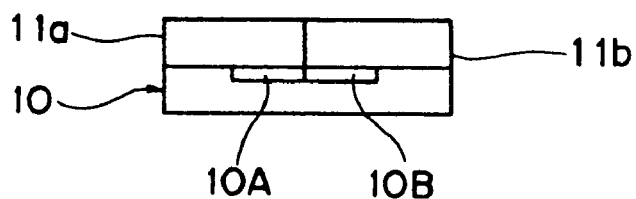
FIG. 4B is a sectional view showing the liquid crystal shutter.

More specifically, as shown in FIGS. 4A and 4B, as an example, the switching part includes a first liquid crystal shutter 11a placed in opposition to the first region 10A of the diffraction grating 10 and a second liquid crystal shutter 11b placed in opposition to the second region 10B of the diffraction grating 10. In this switching part, either one of the first and second liquid crystal shutters 11a, 11b is set into a light-transmitting state while the other liquid crystal shutter is set into a light-shielding state. Therefore, by controlling the opening and closing of the first and second liquid crystal shutters 11a, 11b, the switching part can select either one of the first region 10A and the second region 10B of the diffraction grating 10 so as to allow a beam to be outputted from the selected region 10A or 10B but inhibit a beam from being outputted from the non-selected region 10B or 10A. It is noted that the opening-and-closing control for the liquid crystal shutters 11a, 11b may be implemented by the control section 9.

Figure 5:
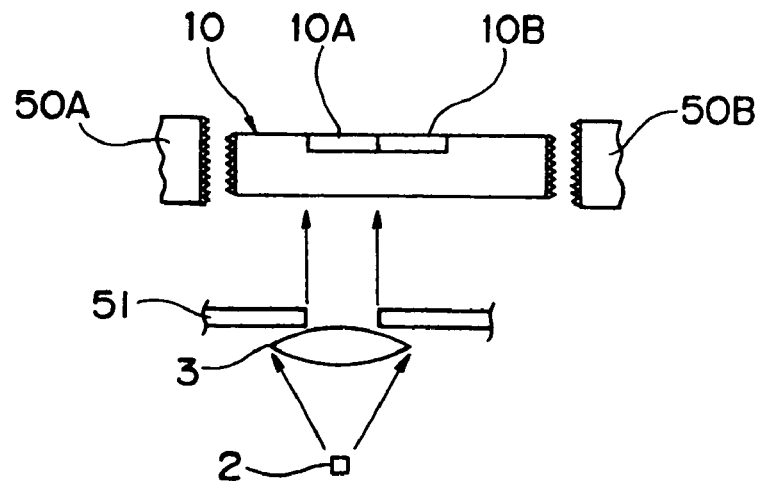
FIG. 5 is a sectional view showing an actuator as another example of the switching part.

Next, referring to FIG. 5, a case in which actuators 50A, 50B for moving a diffraction grating 10 are included as another example of the switching part is explained. This example includes a throttle part 51 which covers an outer peripheral portion of the light-emission side lens 3, where output light throttled by the throttle part 51 is made to go incident on the first region 10A or the second region 10B of the diffraction grating 10. That is, as the actuators 50A, 50B move vertical to the traveling direction of the output light and parallel to the surface on which the first, second grooves 24, 25 of the first, second regions 10A, 10B are formed, the diffraction grating 10 is moved vertical to the traveling direction of the output light and parallel to the surface. As a result of this, either one of the first region 10A and the second region 10B of the diffraction grating 10 is selected, thus making the output light of the light-emitting element 2 incident on the selected region. It is noted that the actuators 50A, S0B may be controlled for its drive by the control section 9. In this case, as the structure of the switching part, for example, such a structure that an actuator of optical disk drive moves a pickup objective lens may be applied.

SECOND MODIFICATION EXAMPLE

Figure 6:
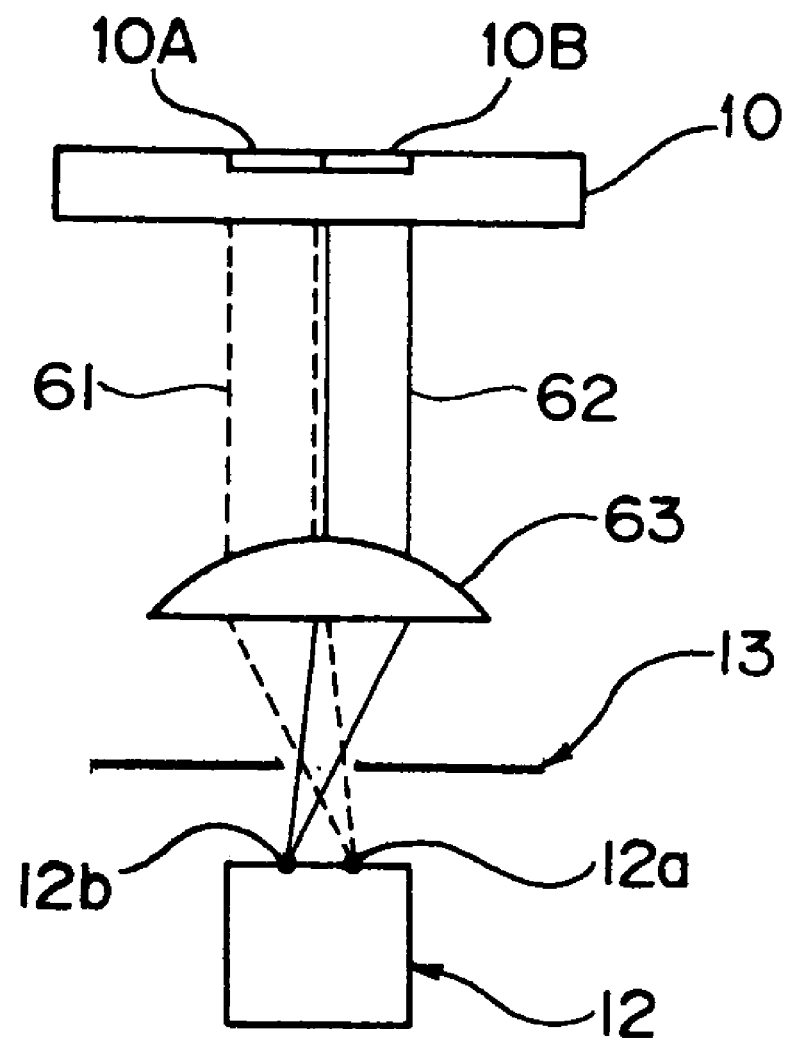
FIG. 6 is a schematic view showing a second modification example of the embodiment.
Figure 7A:
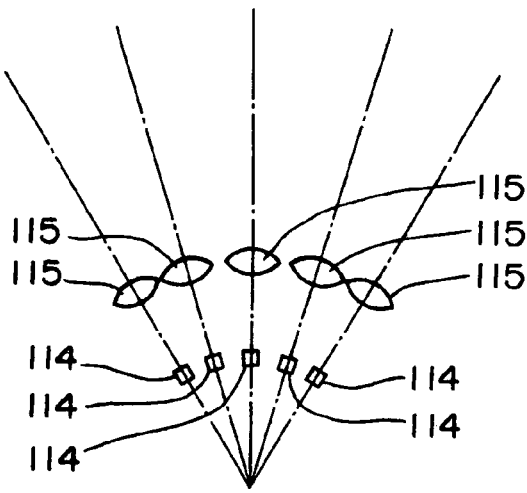
FIG. 7A is a view showing a plurality of light-emitting elements and a plurality of light-emission side lenses of a multi-beam optical range sensor according to a prior art.
Figure 7B:
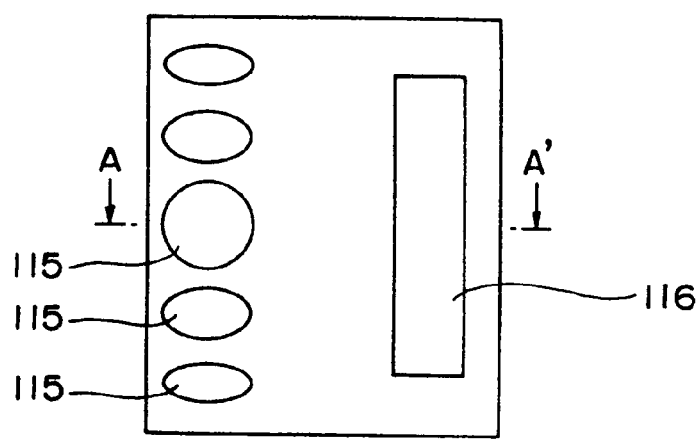
FIG. 7B is a plan view of the prior-art multi-beam optical range sensor.
Figure 7C:
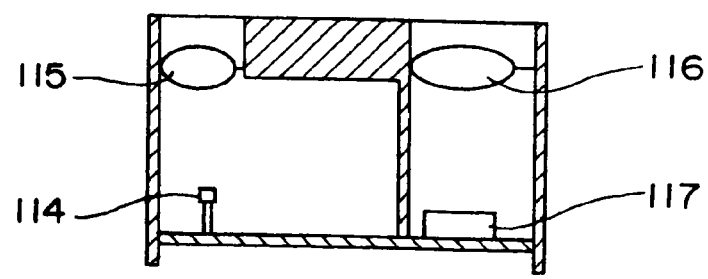
FIG. 7C is a sectional view taken along the line A-A' of the plan view of FIG. 7B.

Next, referring to FIG. 6, a second modification example of the embodiment is explained. This second modification example includes a diffraction grating 10 similar to that of the foregoing first modification example.

This second modification example includes a light-emitting element 12 in place of the light-emitting element 2 of FIG. 1. The light-emitting element 12 has a first light-emitting point 12a and a second light-emitting point 12b. Also this modification example has a slit 13 placed between the light-emitting element 12 and a light-emission side lens 63. Then, first output light 61 outputted from the first light-emitting point 12a of the light-emitting element 12 goes incident on the first region 10A of the diffraction grating 10 while second output light 62 outputted from the second light-emitting point 12b goes incident on the second region 10B of the diffraction grating 10. The control section 9 controls the light-emitting element 12 so that either one of the first, second light-emitting points 12a, 12b is selected and made to emit light. As a result of this, without the need for the liquid crystal shutter or the actuator for moving the diffraction grating described above, either one of the first, second regions 10A, 10B of the diffraction grating 10 can be selected and made to emit a beam, and moreover the sensor can be simplified in its drive and downsized as well.

According to a self-propelled cleaner on which the multi-beam optical range sensor of this embodiment is mounted, the cleaner runs by self propulsion while detecting any obstacles or walls or the like in a room, thus enabled to clean automatically and fulfill efficient cleaning. Further, according to an air conditioner on which the multi-beam optical range sensor of the foregoing embodiment or the first and second modification examples is mounted, since the air conditioner can detect a position at which a person is and, based on this detection, an optimum state as to the direction and intensity of air, temperature and the like can be controlled, it becomes implementable to provide an air conditioner which is human-body friendly and energy-saving.

As described above, according to the multi-beam optical range sensor of the embodiment of the present invention, there can be provided a smaller-sized, high-performance sensor which has a wide-range angle of visibility for detection of measuring objects so as to be able to detect the direction of an object, as well as the distance to the object, present within the range of the angle of visibility. Besides, according to the multi-beam optical range sensor of the invention, the numbers of light-emitting elements and light-emission side lenses can be reduced so that the multi-beam optical range sensor can be provided at low price, as compared with the prior art. Furthermore, when the multi-beam optical range sensor is mounted, it becomes implementable to fulfill self-propelled cleaners, air conditioners or the like which are capable of efficient operation.

Although the present invention has been described as above, it is obvious that the present invention can be modified by a variety of methods. Such modifications are not regarded as departing from the spirit and scope of the present invention, and it is appreciated that improvements apparent to those skilled in the art are fully included within the scope of the following claims.

The invention claimed is:

1. A multi-beam optical range sensor comprising:
   a semiconductor laser;
   a diffraction grating which has a first region where a first plurality of grooves is formed and a second region where a second plurality of grooves generally perpendicular to the first plurality of grooves is formed and which is configured to diffract and split output light of the semiconductor laser into a plurality of beams;
   a first and second light-receiving parts, each of which is configured to receive a beam diffracted by the first and second region, respectively, and subsequently reflected by an object, whose absolute distance from the multi-beam optical range sensor is to be measured;
   a switching part configured to select either one of the first and second regions so as to allow a beam to be outputted from the selected region but inhibit a beam from being outputted from the non-selected region; and
   a control section configured to process light-reception signals outputted by the first and second light-receiving parts and to drive the semiconductor laser at a specified timing, wherein
   the switching part comprises a first liquid crystal shutter placed in opposition to the first region of the diffraction grating, and a second liquid crystal shutter placed in opposition to the second region of the diffraction grating.

2. The multi-beam optical range sensor as claimed in claim 1, wherein
   each of the first and second light-receiving parts has sub-parts equal in number to the plurality of diffracted beams, for receiving corresponding beam, and
   the sub-parts are integrated in respective one element as the first and second light-receiving parts.

3. The multi-beam optical range sensor as claimed in claim 2, wherein
   the control section is configured to receive inputs of specified pulse signals and to read a plurality of light-reception signals derived from each of the sub-parts of first and second light-receiving parts with specified time delays corresponding to the pulse signals, respectively, from one terminal.

4. The multi-beam optical range sensor as claimed in claim 1, wherein
   the first and second regions of the diffraction grating are configured to split the output light into a plurality of beams of generally equal intensity.

5. The multi-beam optical range sensor as claimed in claim 1, further comprising
   output terminals which are equal in number to the plurality of light-receiving parts, wherein
   light-reception signals derived from the light-receiving parts are read out from the output terminals in parallel, respectively.

6. A self-propelled cleaner equipped with the multi-beam optical range sensor as defined in claim 1.

7. An air conditioner equipped with the multi-beam optical range sensor as defined in claim 1.

8. A multi-beam optical range sensor comprising:
   a semiconductor laser;
   a diffraction grating which has a first region where a first plurality of grooves is formed and a second region where a second plurality of grooves generally perpendicular to the first plurality of grooves is formed and which is configured to diffract and split output light of the semiconductor laser into a plurality of beams;
   a first and second light-receiving parts, each of which is configured to receive a beam diffracted by the first and second region, respectively, and subsequently reflected by an object, whose absolute distance from the multi-beam optical range sensor is to be measured;
   a switching part configured to select either one of the first and second regions so as to allow a beam to be outputted from the selected region but inhibit a beam from being outputted from the non-selected region;
   a control section configured to process light-reception signals outputted by the first and second light-receiving parts and to drive the semiconductor laser at a specified timing, wherein
   the switching part comprises an actuator configured to move the diffraction grating so as to make output light of the semiconductor laser incident on a selected either one of the first and second regions but to inhibit output light of the semiconductor laser from being incident on the other non-selected either one of the first and second regions.

9. A multi-beam optical range sensor comprising:

a semiconductor laser;

a diffraction grating configured to diffract and split output light of the semiconductor laser into a plurality of beams;

a plurality of light-receiving parts, each of which is configured to receive a corresponding one of said plurality of beams diffracted by the diffraction grating and subsequently reflected by an object, whose absolute distance from the multi-beam optical range sensor is to be measured;

wherein the number of the beams diffracted by the diffraction grating is equal to the number of the light-receiving parts; and a control section configured to process a plurality of light-reception signals outputted by the plurality of light-receiving parts and to drive the light-emitting element at a specified timing, wherein the diffraction grating comprises a first region in which a first plurality of grooves is formed, and a second region in which a second plurality of grooves generally perpendicular to the first plurality of grooves is formed, and the multi-beam optical range sensor further includes a first light-receiving part which is so placed as to receive a beam diffracted by the first region, and a second light-receiving part which is so placed as to receive a beam diffracted by the second region, and the semiconductor laser comprises a first light-emitting point for outputting first output light which is made to go incident on either one of the first and second regions, and a second light-emitting point for outputting second output light which is made to go incident on the other either one of the first and second regions, and wherein the control section is configured to perform control for driving of the semiconductor laser so that either one of the first and second light-emitting points is selected so as to emit light.

* * * * *